(12) United States Patent
Kim

(10) Patent No.: US 8,229,720 B2
(45) Date of Patent: Jul. 24, 2012

(54) ATMOSPHERIC FLOW SIMULATION METHOD CONSIDERING INFLUENCE OF TERRAIN ELEVATION DATA RESOLUTION

(75) Inventor: Hyun-Goo Kim, Daejeon (KR)

(73) Assignee: Korea Institute of Energy Research (KR)

( * ) Notice: Subject to any disclaimer, the term of this patent is extended or adjusted under 35 U.S.C. 154(b) by 240 days.

(21) Appl. No.: 12/613,063

(22) Filed: Nov. 5, 2009

(65) Prior Publication Data

US 2011/0054868 A1 Mar. 3, 2011

(30) Foreign Application Priority Data

Sep. 2, 2009 (KR) .................. 10-2009-0082485

(51) Int. Cl.
| | |
|---|---|
| G06F 7/50 | (2006.01) |
| G01W 1/00 | (2006.01) |
| G01P 5/00 | (2006.01) |
| G01P 7/00 | (2006.01) |
| G01P 9/00 | (2012.01) |
| G01P 11/00 | (2006.01) |

(52) U.S. Cl. ................... 703/9; 702/3; 702/142
(58) Field of Classification Search .......... 703/9; 702/3, 702/142
See application file for complete search history.

(56) References Cited

PUBLICATIONS

Hyun-Goo Kim, Sang-Woo Woo, "Influence of Terrain Elevation data Resolution of Ground-Level Wind Flow Simulations", May 8, 2009.*
Sang-Woo Woo, and Hyun-Goo Kim, "Influence of Topography Resoluton on Atmospheric Flow Simulation", Jun. 25, 2009.*
Bert Blocken, "CFD Simulation of the atmospheric boundary layer: wall function problems", 2007.*
Niels G. Mortensen and Erik L. Petersen, "Influence of Topographical input Data on the accuracy of wind flow modelling in complex terrain", 1997.*
G. T. Bitsuamlak, "Numerical Evaluation of Wind Flow over complex terrain: review", 2004.*
S.Pal Arya, "Introduction to Micrometeorology" second edition 2001, p. 195-203.*
Niels G. Mortensen, "Improving wAsP prediction in (too) complex terrain", 2007.*
Sang-Woo Woo et al., "Influence of Topography Resolution on Atmospheric Flow Simulation", The Korean Society for New and Renewable Energy, Jun. 25, 2009, pp. 1-6.
Hyun-Goo Kim et al., "Influence of Terrain Elevation Data Resolution on Ground-Level Wind Flow Simulations", The Korean Society for Atmospheric Environment, May 8, 2009, pp. 1-4.

* cited by examiner

*Primary Examiner* — David Silver
*Assistant Examiner* — Angel Calle
(74) *Attorney, Agent, or Firm* — Cantor Colburn LLP

(57) ABSTRACT

Provided is an atmospheric flow simulation method for reducing a simulation error of wind speed caused due to an influence of different terrain resolutions using a numerical simulation; and, more particularly, an atmospheric flow simulation method which can compensate the wind speed of the atmospheric flow field using low-resolution terrain data by introducing an influence of different terrain resolutions as a terrain roughness and adding it to the terrain condition.

3 Claims, 7 Drawing Sheets

ATMOSPHERIC FLOW SIMULATION METHOD CONSIDERING INFLUENCE OF TERRAIN ELEVATION DATA RESOLUTION

CROSS-REFERENCE(S) TO RELATED APPLICATIONS

The present invention claims priority of Korean Patent Application No. 10-2009-0082485, filed on Sep. 2, 2009, which is incorporated herein by reference.

BACKGROUND OF THE INVENTION

1. Field of the Invention

The present invention relates to an atmospheric flow simulation method for reducing a simulation error of wind speed caused due to an influence of different terrain resolutions using a numerical simulation; and, more particularly, to an atmospheric flow simulation method which can compensate the wind speed of the atmospheric flow field using low-resolution terrain data by obtaining a terrain roughness based on a difference in terrain resolutions and using the terrain roughness as a ground surface condition.

2. Description of Related Art

The numerical flow simulation widely used for simulating the atmospheric flow field has been spotlighted as an important scheme for estimation and measurement in various fields such as atmospheric environment, wind engineering, wind power plant station and the like, because it can correctly simulate features of mechanic turbulent flows by complex terrain.

With respect to numerical flow simulation of atmospheric flow field, the important input data are atmospheric field boundary condition as well as terrain data. To acquire the terrain data in Korea, either sampling of a terrain elevation in grid from contour lines in a numerical map of a National Geographical Information Institute or a shuttle radar topography mission SRTM of 90 m resolution Digital Elevation Model DEM from United States Geographical Survey USGS has been usually used. In a special case, 10 m resolution DEM from the Ministry of the Environment or 1 m resolution DEM from the National Geographical Information Institute can be ued as the terrain data.

However, using high-resolution terrain data (or, a fine-resolution terrain data) such as 1 m resolution DEM with respect to a total simulation area is limited because of heavy numerical simulation load. Therefore, while increasing the terrain resolution only for an interested region or a region of high terrain variation upon performing the numerical flow simulation, the low-resolution terrain data (or, a coarse-resolution terrain data) is obtained by an averaging process of the high-resolution terrain data with respect to a grid unit size.

FIG. 1 is a drawing showing a comparison of the wind speeds at height 10 m from surface using 1 m resolution DEM and 100 m resolution DEM respectively.

Referring to FIG. 1, it is shown that the wind speed of the simulation result using 100 m resolution DEM is higher than that of the simulation result using 1 m resolution DEM because the terrain is moderately sloped as a result of an averaging process. This is a consequent because a wind speed profile near the surface depends on the drag of the surface and fluid density, providing that it is under neutral atmosphere condition. it catch an attention that the simulation error in the downstream zone is accumulatively increased due to the averaged terrain elevation. Particularly, there is an inherent danger of including serious error in the simulation result using the low-resolution terrain data since the simulation range can reach several tens km when simulating the numerical atmospheric flow field to select the wind park.

In low-resolution terrain data, terrain variety expressed in the high-resolution terrain data could be neglected so that the surface becomes planed. It would cause an error in simulating the atmospheric flow field near the surface.

SUMMARY OF THE INVENTION

An embodiment of the present invention is directed to providing an atmospheric flow simulation method for reducing an error occurred upon simulating the atmospheric flow field. The present invention enables to reduce a difference between the atmospheric flow field simulation obtained from the low-resolution terrain data and the atmospheric flow field simulation obtained from the high-resolution terrain data by reflecting an influence of elevation difference between the high-resolution terrain data and the low-resolution terrain data obtained from the high-resolution terrain data on the atmospheric flow field simulation using the low-resolution terrain material.

To achieve the object of the present invention, the present invention provides an atmospheric flow simulation method considering a terrain elevation data resolution in simulating a wind speed for a certain section using a numerical simulation, including: obtaining a height root mean square error for the specific section a first resolution digital terrain elevation model and a second resolution digital terrain elevation model, the second resolution digital terrain elevation model having a finer resolution than the first resolution digital terrain elevation model; obtaining a terrain resolution variable for the specific section by using the height root mean square error for the specific section; and computing the wind speed for the specific section in the first resolution digital terrain elevation model by using the terrain resolution variable for the specific section as a ground surface condition for the specific section.

Herein, the height root mean square error is a square root of an average square value of a difference in elevation of the specific section when simulated in the first and the second digital terrain elevation models.

Preferably, the obtaining of the terrain resolution variable includes generating two or more virtual terrains having different height root mean square errors between the first and second resolution digital terrain elevation models; obtaining a terrain roughness for each of the two or more virtual terrains; obtaining a linear regression equation between the height root mean square error and the terrain roughness based on values of the height root mean square error and the terrain roughness for the two or more virtual terrains; and obtaining a terrain roughness for the specific section by substituting the height root mean square error for the specific section into the linear regression equation between the height root mean square error and the terrain roughness, wherein the terrain roughness for the specific section is used as the terrain resolution variable for the specific section.

Preferably, the step of computing the wind speed comprises comparing a terrain roughness for the specific section with a ground surface roughness, wherein the terrain roughness is used as the ground surface condition for the specific section if the terrain roughness is greater than the ground surface roughness.

DESCRIPTION OF SPECIFIC EMBODIMENTS

The advantages, features and aspects of the invention will become apparent from the following description of the embodiments with reference to the accompanying drawings, which is set forth hereinafter.

In the present invention, a height root mean square error H_RMSE is a mean square of an average value computed by squaring an elevation difference between terrains displayed in different terrain elevation models. For example, the average value of a difference between the elevation $H_H$ of the terrain expressed in a specific high-resolution terrain elevation model (or, fine-resolution terrain elevation model) and the elevation $H_L$ of the terrain expressed in a specific low-resolution terrain elevation model, obtained based on the specific high-resolution terrain elevation model, is expressed in an Equation 1 below as the height root mean square error H_RMSE of the specific low-resolution terrain elevation model.

$$H\_SE = \sqrt{\frac{\sum_{i=1}^{n}(H_{H,i} - H_{L,i})^2}{n}} \quad \langle \text{Equation 1} \rangle$$

A wind speed absolute error U_AE is an absolute value of a wind speed difference in the wind speed distribution simulated from the terrains displayed in the different terrain elevation models. The absolute error U_AE in the wind speeds of the wind speed $U_H$ distribution simulated from the terrain displayed in the specific high-resolution terrain elevation model and the wind speed $U_L$ distribution simulated from the terrain defined as the specific low-resolution terrain elevation model obtained from the specific high-resolution terrain elevation model is expressed as shown in an Equation 2.

$$U\_AE = |H_{H,i} - U_{L,i}| \quad \text{<Equation 2>}$$

The present invention is related to an atmospheric flow simulation method considering different terrain elevation data resolutions in simulating the wind speed over a specific section in a topographical map of the specific low-resolution terrain elevation model of which elevation data is obtained by averaging an elevation data of a topographical map of the specific high-resolution terrain elevation model using the numerical simulation.

It is possible to generate the topographical map of the specific low-resolution terrain elevation model having the averaged elevation from the topographical map of the specific high-resolution terrain elevation model via computing an average value, in order to reduce the heavy numerical load due to the terrain data which is inputted upon executing the numerical simulation of the atmospheric flow field.

In this case, the surface of the specific high-resolution terrain elevation model becomes more moderately sloped than that of the specific high-resolution terrain elevation model. Therefore, the error by the increased wind speed affects more seriously in the simulation using the specific low-resolution terrain elevation model than in the simulation using the specific high-resolution terrain elevation model.

Figure 3:
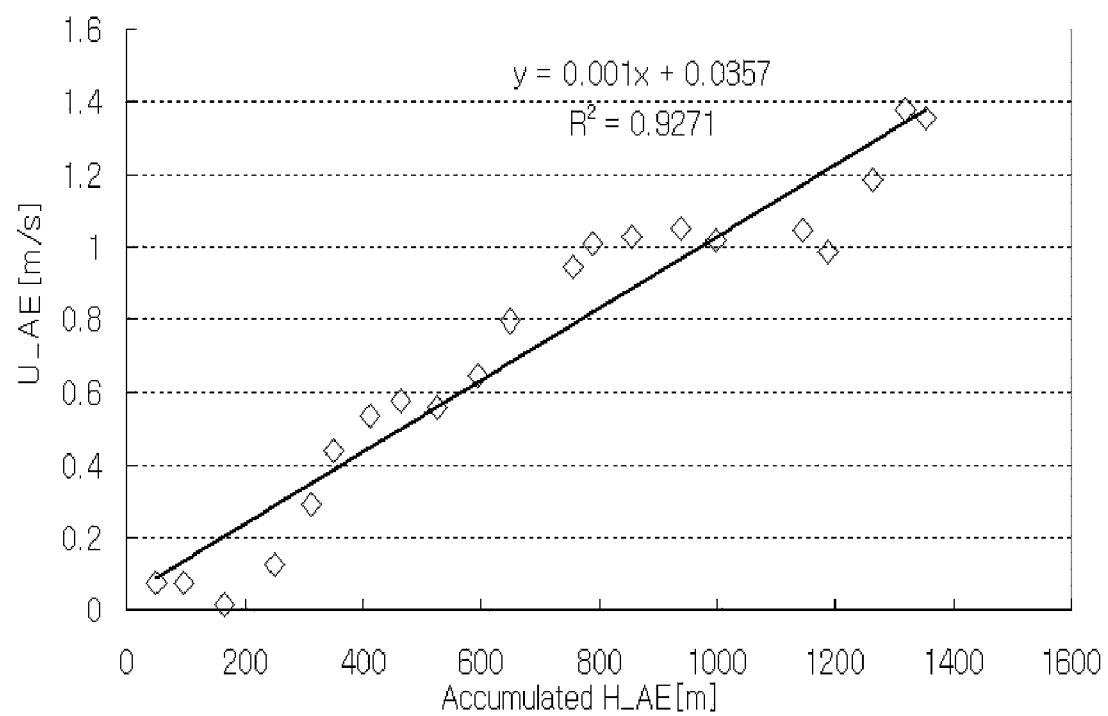
FIG. 3 is a graph showing a relation between an absolute error in accumulated elevation and an absolute error in a wind speed.

Meanwhile, FIG. 3 is a graph showing a relation between an absolute error in accumulated elevation of the specific high-resolution terrain elevation model and an absolute error in the wind speed which is achieved from the each simulation using the specific low-resolution terrain elevation model and the specific high-resolution terrain elevation model. It is found that the absolute error in the accumulated elevation can be used as a major variable for reducing the wind speed error in the terrain elevation model at the specific resolution, since the absolute error in the accumulated elevation and the absolute error in the wind speed are shown as having a gradual linear regression relation in FIG. 3.

Figure 1:
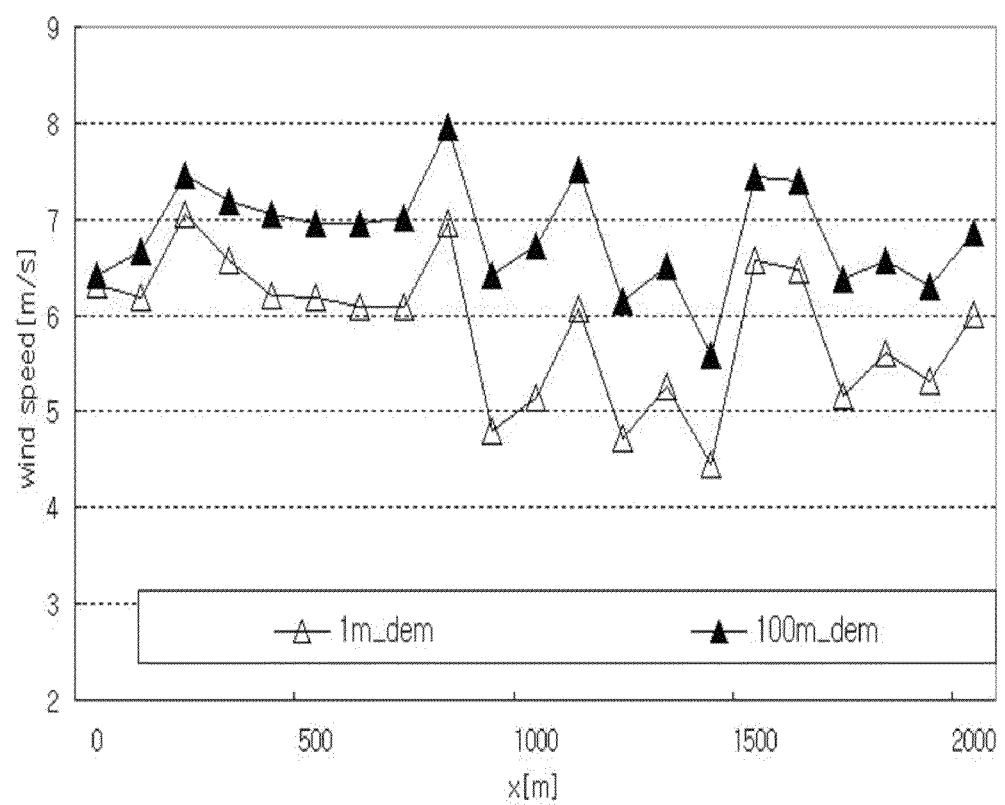
FIG. 1 is a graph showing a numerical flow simulation using 1 m resolution DEM and 100 m resolution DEM.
Figure 2:
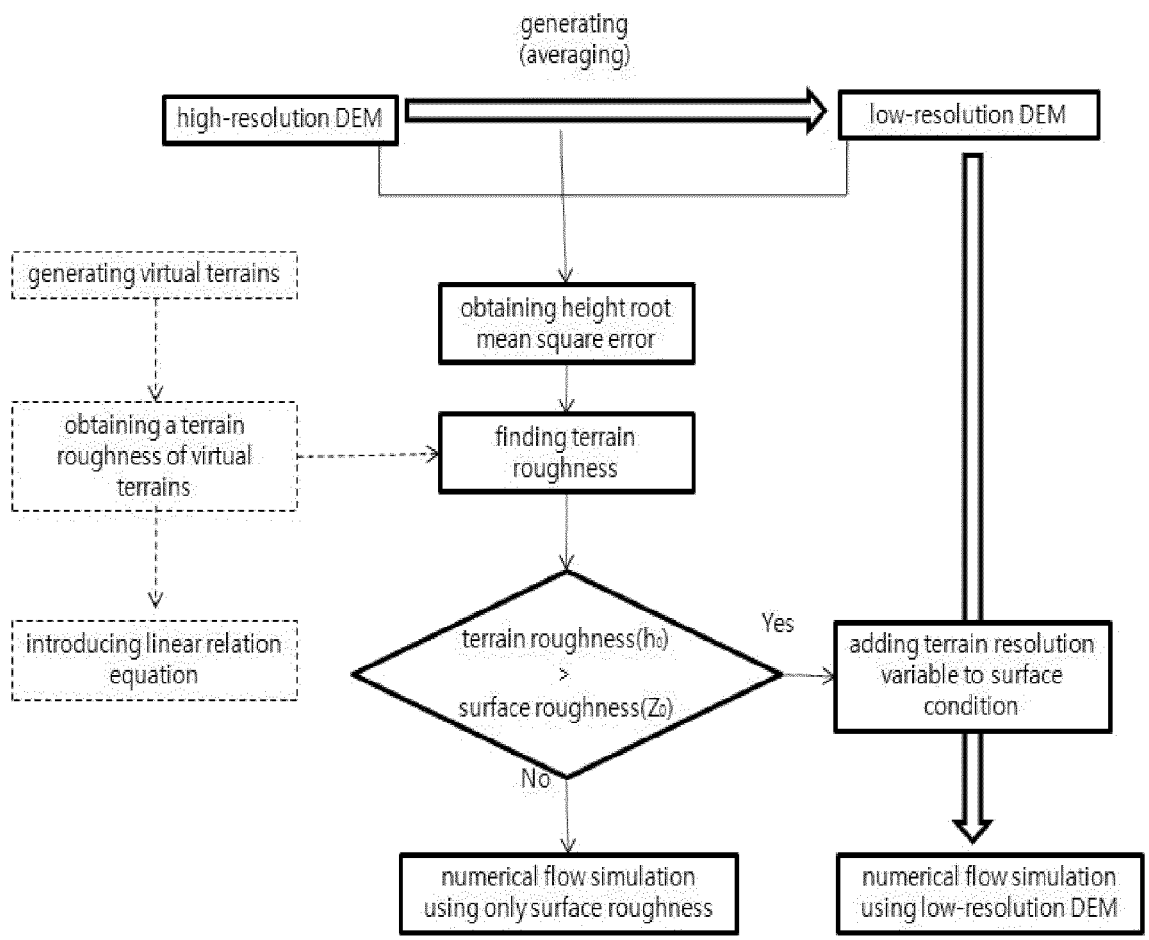
FIG. 2 is a flow diagram showing the atmospheric flow simulation method considering a terrain elevation data resolution in accordance with an embodiment of the present invention.

For the purpose of it, the present invention is aimed on reducing an error caused due to a terrain resolution difference by providing an atmospheric flow simulation method considering different terrain elevation data resolutions comprising steps of: obtaining a height root mean square error for the specific section between the high-resolution digital terrain elevation model and the low-resolution digital terrain elevation model; obtaining a terrain resolution variable for the specific section by using the height root mean square error for the specific section; and computing a wind speed for the specific section of the low-resolution digital terrain elevation model by using the terrain resolution variable for the specific section as a ground surface condition for the specific section, as shown in a flow chart of FIG. 2. For example, the ground surface condition for the specific section includes a ground surface roughness thereof.

The height root mean square error for the specific section can be obtained from the Equation 1.

The step of obtaining a terrain resolution variable for the specific section from the height root mean square error for the specific section comprises steps of: generating two or more virtual terrains having different height root mean square errors between the specific high-resolution digital terrain elevation model and the specific low-resolution digital terrain elevation model; obtaining the terrain roughness for each of the virtual terrains; obtaining a linear regression equation between the height root mean square error and the terrain roughness based on values of the height root mean square error and the terrain roughness for the two or more virtual terrains; obtaining a terrain roughness for the specific section by substituting the height root mean square error for the specific section into the linear regression equation between the height root mean square error and the terrain roughness; and using the terrain roughness as the ground surface condition if the terrain roughness is greater than the ground surface roughness.

First of all, two or more virtual terrains are generated. At this time, the each virtual terrains have the different elevation average square root error between the terrain elevation models at the specific high-resolution and the specific low-resolution which are used to simulate the atmospheric flow field.

The number of the virtual terrains is advantageously multiple but it is sufficient if more than two are generated, for the purpose of finding a linear regression equation between the height root mean square error H_RMSE and the terrain resolution variable.

If two or more virtual terrains having different height root mean square error from each other are generated, then the terrain roughness is found for each virtual terrain. The terrain roughness for the virtual terrain can be obtained from the wind speed profile equation.

Specifically, one specific point of the virtual terrain is specified and the virtual terrain roughness for the specific point can be obtained by the wind speed profile equation as shown in Equation 3.

$$u = \frac{u^*}{k} \ln\left(\frac{z}{z_0}\right) \qquad \text{(Equation 3)}$$

Where, $u^*$ is a friction speed, k is von Karman constant and $z_0$ is a ground surface roughness.

Figure 4:
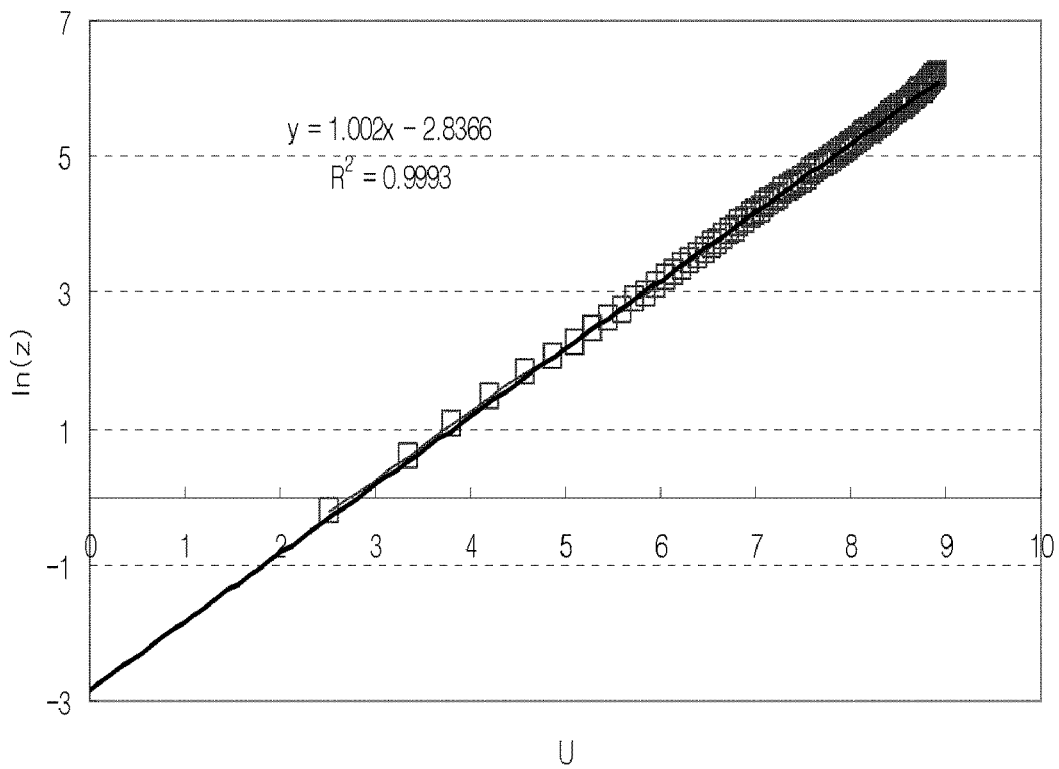
FIG. 4 is a graph having a wind speed profile equation inserted.

If the equation 3 is simply settled into a linear regression equation for variables $\ln(z)$ and u, it will be an equation 4 shown below.

$$\ln(z) = \frac{k}{u^*} u + \ln(z_0) \qquad \text{(Equation 4)}$$

where, the ground surface roughness $z_0$ for one specific point in the virtual terrain can be found by inserting a vertical line upto the height of u=0 as shown in FIG. 4. In a similar method, the terrain roughness can be found by substituting the terrain roughness h0 for the surface roughness $z_0$.

Considering that the wind speed profile can be locally different for any specific point of the virtual terrain, it is preferable to find the virtual terrain roughness for each of two or more specific points and obtain the terrain roughness of the virtual terrain from the average value of the above each terrain roughness.

Figure 5:
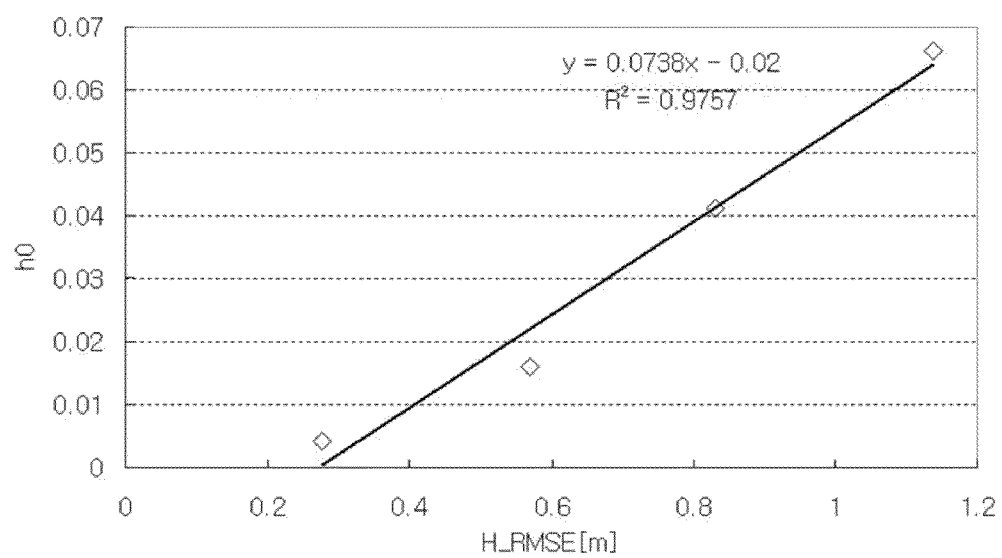
FIG. 5 is a graph showing a relation between the ground surface roughness for each virtual terrain and the height root mean square error for each virtual terrain.

By deriving the linear regression equation (height root mean square error–terrain roughness) shown in FIG. 5 representing the relation between the surface roughness for each virtual terrain and the height root mean square error for each virtual terrain as a graph, it is possible to standardize the terrain roughness.

Returning to simulation of the wind speed at the certain section of the specific low-resolution terrain elevation model, it is possible to acquire the terrain roughness for the specific section by substituting the height root mean square error for the specific section for the height root mean square error of the linear regression equation above.

As the terrain roughness for the specific section is rooted from the differences of terrain resolution for the certain section, the terrain roughness can be used as the terrain resolution variable for the certain section. The wind speed can be compensated by using the terrain roughness for the specific section as the ground surface condition for the specific section in simulation.

It is possible to confirm an effect of the compensation by comparing the wind speed simulation results before and after using the terrain roughness for the specific section of the specific low-resolution terrain elevation model as the ground surface condition with the wind speed simulation result using the specific high-resolution terrain elevation model respectively.

Meanwhile, the step of computing the wind speed comprises a step of comparing the terrain roughness for the specific section with the surface roughness, in which it is preferable to use the terrain roughness as the ground surface condition if the terrain roughness is greater than the ground surface roughness.

Specifically, if the terrain roughness is lower than the ground surface roughness, the surface roughness itself is preferably applied to the ground surface condition corresponding to the specific section for compensating the difference in the terrain resolution. If the terrain roughness is greater than the ground surface roughness, the terrain roughness is used as the ground surface condition for compensating the difference in the terrain resolution because influence due to the difference in the terrain resolution is greater than the surface roughness.

Though one terrain resolution variable is applied for all the sections upon simulating the wind speed in the certain section of the specific low-resolution terrain elevation model, the certain section can be divided into multiple sections of lower unit so that the terrain resolution variable of each multiple section may be acquired from the height root mean square error for each multiple section, which brings more accurate compensation result.

Hereinafter, the numerical simulation according to the atmospheric flow simulation method of the present invention will be specifically described via an embodiment of 2-dimensional terrain simulation.

Using 1 m resolution DEM from the National Geographical Information Institute as the specific high-resolution terrain elevation model, the atmospheric flow field in a beach of Jeju-island is simulated. From the 1 m resolution DEM 1 km, 100 m resolution DEM 2 km which is averaged with lattice size 100 m is acquired The acquired 100 m resolution terrain elevation model 2 km is divided into a unit of 200 m to compute the height root mean square error for each of 10 short sections.

Four virtual terrains 1 km having the height root mean square error H_RMSE of 0.276 m, 0.568 m, 0.831 m and 1.138 m between 1 m resolution and 100 m resolution are generated respectively in order to standardize the terrain roughness.

The terrain roughness for each separate point is computed from the wind speed profile at 3 points (500 m, 600 m and 700 m) in the virtual terrain 1 km having the height root square error H_RMAE of 0.276 m. For the virtual terrain having the height root square error H_RMSE of 0.568 m, 0.831 m and 1.138 m, each terrain roughness is obtained according to the method mentioned-above.

FIG. 5 is a graph showing a relation of the height root mean square error H_MAE and the terrain roughness for the virtual terrain. At this time, a linear regression equation of the height root mean square error-terrain roughness can be obtained from the relation which is linear regression.

As a result of substituting each height root mean square error H_RMSE for 10 sections of the 100 m resolution terrain elevation model 2 km for the height root mean square for the linear regression equation, the terrain roughness ($h_0$) for each shoot section is computed as in a table 1 below. When the H_RMSE is lower than about 0.27 in the linear regression equation, the terrain roughness lower than 0 can exist. At this time, since the terrain roughness must not be lower than 0, a section having H_RMSE lower than 0.27 is given with 0.001 which represents the roughness at a flat land.

TABLE 1

|  | H_RMSE | h0 |
|---|---|---|
| 0~200 m | 2.541816 | 0.167586 |
| 201~400 m | 0.624859 | 0.026115 |
| 401~600 m | 1.26849 | 0.073615 |
| 601~800 m | 0.909105 | 0.047092 |
| 801~1000 m | 1.810407 | 0.113603 |
| 1001~1200 m | 1.249697 | 0.072223 |
| 1201~1400 m | 1.136072 | 0.063842 |
| 1401~1600 m | 2.025514 | 0.129483 |
| 1601~1800 m | 1.000212 | 0.063816 |
| 1801~2000 m | 0.443383 | 0.012722 |

Figure 6:
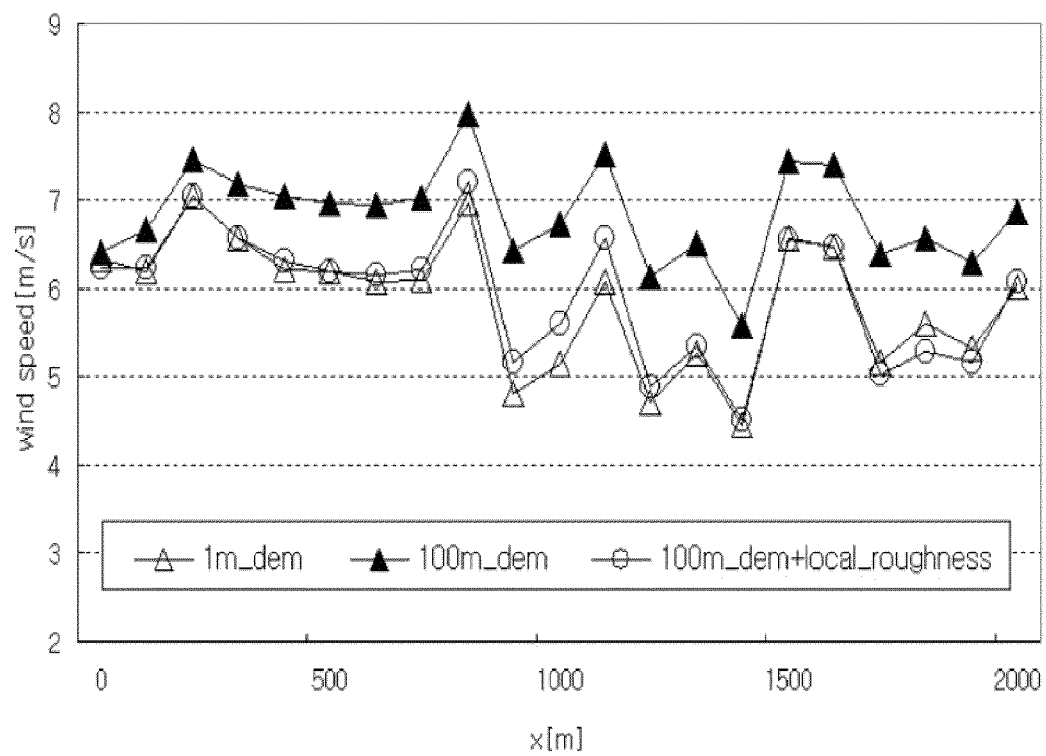
FIG. 6 is a graph showing a result of the atmospheric flow field simulation according to one embodiment of the present invention.

FIG. 6 shows an atmospheric flow field simulation result which is compensated by using an each terrain roughness for 10 sections in the 2 km of 100 m_DEM as the terrain resolution variable of each ground surface condition of 10 sections.

In FIG. 6, the atmospheric flow simulation result using the 1 m resolution terrain elevation model and 100 m resolution terrain elevation model without the compensation is also shown. The absolute wind speed average error at the height 10 m for total 2 km is 0.96 m/s without the compensation procedure, whereas the absolute wind speed error is reduced upto 0.14 m/s as a result of the compensation procedure according to the present invention.

Meanwhile, the atmospheric flow field simulation method considering the different terrain resolution according to the present invention can be applied to the two-dimensional terrain simulation mentioned above as well as a three-dimensional terrain simulation mentioned later.

Figure 7:
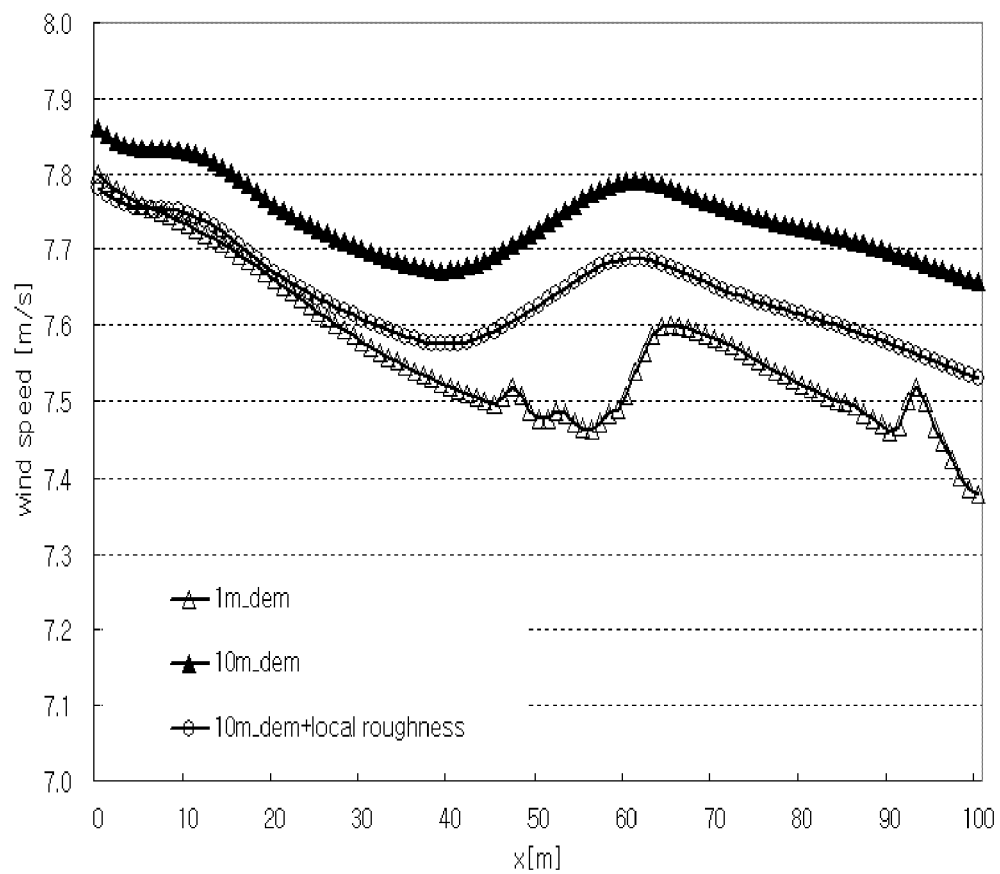
FIG. 7 is a graph showing a result of 3-dimensional atmospheric flow simulation according to another embodiment of the present invention.

FIG. 7 shows an embodiment of performing three-dimensional numerical flow simulation after generating a 10 m low-resolution terrain elevation 100 m which is averaged with 10 m lattice size from 1 m resolution DEM in National Geographical Information Institute as the specific high-resolution terrain elevation model according to the atmospheric flow field simulation method. It shows that the average absolute error in the wind speed is considerably reduced by applying the present invention to 3-dimensional terrain simulation.

According to the present invention, it is possible to consider the difference of the terrain data upon the numerical simulation by reflecting the terrain roughness according to the resolution difference of the terrain data via the atmospheric flow field simulation.

Subsequently, it is possible to reduce the simulation error occurred upon the numerical simulation for the low-resolution terrain data, and particularly to reduce a danger of incurring a serious error upon designing the wind park.

While the present invention has been described with respect to the specific embodiments, it will be apparent to those skilled in the art that various changes and modifications may be made without departing from the spirit and scope of the invention as defined in the following claims.

What is claimed is:

1. An atmospheric flow field simulation method considering a terrain elevation data resolution in simulating a wind speed for a specific section using a numerical simulation, the method comprising:
    obtaining a height root mean square error for the specific section between a first resolution digital terrain elevation model and a second resolution digital terrain elevation model, the second resolution digital terrain elevation model having a finer resolution than the first resolution digital terrain elevation model;
    obtaining a terrain resolution variable for the specific section by using the height root mean square error for the specific section; and
    computing the wind speed for the specific section in the first resolution digital terrain elevation model by using the terrain resolution variable for the specific section as a ground surface condition for the specific section,
    wherein the height root mean square error is a square root of an average square value of a difference in elevation of the specific section when simulated in the first and the second digital terrain elevation models.

2. The atmospheric flow field simulation method according to claim 1, wherein said obtaining the terrain resolution variable comprises:
    generating two or more virtual terrains having different height root mean square errors between the first and the second resolution digital terrain elevation models;
    obtaining a terrain roughness for each of the two or more virtual terrains;
    obtaining a linear regression equation between the height root mean square error and the terrain roughness based on values of the height root mean square error and the terrain roughness for the two or more virtual terrains; and
    obtaining a terrain roughness for the specific section by substituting the height root mean square error for the specific section into the linear regression equation between the height root mean square error and the terrain roughness,
    wherein the terrain roughness for the specific section is used as the terrain resolution variable for the specific section.

3. The atmospheric flow field simulation method according to claim 1, wherein said computing the wind speed comprises comparing a terrain roughness for the specific section with a ground surface roughness, and the terrain roughness is used as the ground surface condition for the specific section if the terrain roughness is greater than the ground surface roughness.

* * * * *